United States Patent
Chen et al.

(10) Patent No.: US 11,343,811 B2
(45) Date of Patent: May 24, 2022

(54) DATA TRANSMITTING METHOD AND DEVICE, AND STORAGE MEDIUM

(71) Applicant: Xi'an Zhongxing New Software Co., Ltd., Shaanxi (CN)

(72) Inventors: Xianming Chen, Shenzhen (CN); Bo Dai, Shenzhen (CN); Kun Liu, Shenzhen (CN)

(73) Assignee: Xi'an Zhongxing New Software Co., Ltd., Shaanxi (CN)

( * ) Notice: Subject to any disclaimer, the term of this patent is extended or adjusted under 35 U.S.C. 154(b) by 121 days.

(21) Appl. No.: 16/497,274

(22) PCT Filed: Feb. 26, 2018

(86) PCT No.: PCT/CN2018/077277
§ 371 (c)(1),
(2) Date: Sep. 24, 2019

(87) PCT Pub. No.: WO2018/171387
PCT Pub. Date: Sep. 27, 2018

(65) Prior Publication Data
US 2020/0107301 A1    Apr. 2, 2020

(30) Foreign Application Priority Data

Mar. 24, 2017 (CN) .......................... 201710184699.5

(51) Int. Cl.
*H04W 72/04* (2009.01)
*H04L 1/08* (2006.01)
*H04L 69/324* (2022.01)

(52) U.S. Cl.
CPC ............. *H04W 72/042* (2013.01); *H04L 1/08* (2013.01); *H04L 69/324* (2013.01); *H04W 72/044* (2013.01)

(58) Field of Classification Search
None
See application file for complete search history.

(56) References Cited

U.S. PATENT DOCUMENTS 6,151,312 A * 11/2000 Evans ................... H04W 74/02
370/338
8,254,394 B1 * 8/2012 Gummalla ................ H04L 5/00
370/395.43
(Continued)

FOREIGN PATENT DOCUMENTS

CN         101621361 A        1/2010
CN         102916767 A        2/2013
(Continued)

OTHER PUBLICATIONS

International Search Report of Application No. PCT/CN2018/077277—6 pages (dated Jun. 15, 2018).
(Continued)

*Primary Examiner* — Christopher T Wyllie
(74) *Attorney, Agent, or Firm* — Knobbe, Martens, Olson & Bear LLP

(57) ABSTRACT

Provided are a data transmitting and feedback method and apparatus, a device and a storage medium. The data transmitting method includes: selecting a grant-free resource to send a data packet, where the grant-free resource is K continuous time slots of one frequency band, where the K is an integer greater than 0.

19 Claims, 6 Drawing Sheets

---

101

Select a grant-free resource for transmitting a data packet

(56) References Cited

U.S. PATENT DOCUMENTS

| | | | |
|---|---|---|---|
| 11,051,329 B2* | 6/2021 | Sha | H04W 72/044 |
| 2009/0213815 A1* | 8/2009 | Sherman | H04W 74/0841 |
| | | | 370/336 |
| 2011/0176520 A1* | 7/2011 | Patel | H04W 16/14 |
| | | | 370/336 |
| 2014/0254544 A1* | 9/2014 | Kar Kin Au | H04W 72/1268 |
| | | | 370/330 |
| 2015/0006422 A1 | 1/2015 | Carter et al. | |
| 2015/0256303 A1 | 9/2015 | Belghoul et al. | |
| 2015/0289147 A1* | 10/2015 | Lou | H04B 7/0417 |
| | | | 370/329 |
| 2015/0289292 A1* | 10/2015 | Sun | H04L 27/2646 |
| | | | 370/329 |
| 2016/0100422 A1* | 4/2016 | Papasakellariou | |
| | | | H04W 72/1289 |
| | | | 370/329 |
| 2016/0323911 A1 | 11/2016 | Au et al. | |
| 2017/0013640 A1* | 1/2017 | Loehr | H04W 76/14 |
| 2017/0111889 A1* | 4/2017 | Li | H04W 74/08 |
| 2017/0353933 A1* | 12/2017 | Xhafa | H04W 76/25 |
| 2018/0035458 A1* | 2/2018 | Islam | H04L 5/0096 |
| 2018/0123765 A1* | 5/2018 | Cao | H04L 1/1671 |
| 2018/0176945 A1* | 6/2018 | Cao | H04W 72/14 |
| 2018/0219665 A1* | 8/2018 | Yu | H04L 1/1854 |
| 2018/0270807 A1* | 9/2018 | Salem | H04L 5/0048 |
| 2020/0107301 A1* | 4/2020 | Chen | H04L 1/1671 |
| 2020/0178291 A1* | 6/2020 | Sha | H04L 1/1812 |

FOREIGN PATENT DOCUMENTS

| | | |
|---|---|---|
| CN | 104918335 A | 9/2015 |
| CN | 105101223 A | 11/2015 |
| CN | 105284172 A | 1/2016 |
| CN | 105812101 A | 7/2016 |
| CN | 106507486 A | 3/2017 |
| CN | 106507497 A | 3/2017 |
| WO | WO 2016/192597 | 12/2016 |
| WO | WO 2017/041685 | 3/2017 |

OTHER PUBLICATIONS

ZTE, "Discussion on grant-free transmission for URLLC", 3GPP TSG RAN WG1 Meeting #87, Reno, USA (Nov. 14-18, 2016) in 7 pages.
ZTE, "UL grant-free transmission for URLLC", 3GPP TSG RAN WG1 Meeting #88, Athens, Greece,(Feb. 13-17, 2017) in 3 pages.
Intel Corporation, Uplink grant free transmission for URLLC Services, 3GPP TSG RAN WG1 Meeting #88, Athens, Greece, (Feb. 13-17, 2017) in 7 pages.
Panasonic, "Repetition/retransmission of UL grant-free" 3GPP TSG RAN WG1 Meeting #88, Athens, Greece,(Feb. 13-17, 2017) in 2 pages.
China Telcom, "UL grant-free transmission" 3GPP TSG RAN WG1 Meeting #88, Athens, Greece,(Feb. 13-17, 2017) in 3 pages.
Huawei HiSilicon, "Harq feedback indication design for UL grant-free transmission" 3GPP TSG RAN WG1 Ad hoc Meeting, Qingdao, China,(Jun. 27-30, 2017) in 5 pages.
International Search Report in Application No. PCT 2017101846995 dated Jan. 10, 2021 in 4 pages.
Office Action in Chinese Application No. 201710184699.5 dated Nov. 16, 2021 in 12 pages.

* cited by examiner

DATA TRANSMITTING METHOD AND DEVICE, AND STORAGE MEDIUM

CROSS-REFERENCES TO RELATED APPLICATIONS

This is a U.S. National Stage Application, filed under 35 U.S.C. 371, of International Patent Application No. PCT/CN2018/077277, filed on Feb. 26, 2018, which claims priority to Chinese patent application No. 201710184699.5 filed on Mar. 24, 2017, contents of both of which are incorporated herein by reference in their entireties.

TECHNICAL FIELD

The present disclosure relates to the field of wireless communications and, in particular, to a data transmitting method and apparatus, a data feedback method and apparatus, a device and a storage medium.

BACKGROUND

To meet the fifth generation (5G) mobile communication requirements, it needs to further improve system efficiency and reduce delay, the 3rd Generation Partnership Project (3GPP) standards organization is discussing the next generation access technology that is named New Radio (NR).

The NR technology is applied in three scenarios: enhanced Mobile Broadband (eMBB), massive Machine Type Communications (mMTC) scenario and Ultra-Reliable and Low Latency Communications (URLLC).

For an uplink of a terminal device, especially for uplinks of the above three scenarios, in order to reduce user plane delay, a grant-free transmitting mechanism has been accepted by the standards organization. A grant-free transmitting process is as follow: a set of grant-free resources is pre-configured for the terminal device; after a data packet arrives, the terminal device selects a grant-free resource from the pre-configured set of grant-free resources; and different terminal devices are allowed to share the same set of grant-free resources. So far, for uplink grant-free transmitting, no better solution has yet been proposed for defining the grant-free resource.

SUMMARY

In order to solve technical problems in the existing art, embodiments of the present disclosure provide a data transmitting method and apparatus, a device and a storage medium to solve the problem in the existing art of how to define a grant-free resource. The embodiments of the present disclosure further provide a feedback method and apparatus, a device and a storage medium to reduce power loss when a terminal receives feedback.

To achieve the preceding object, solutions in the embodiments of the present disclosure are implemented as follows.

The embodiments of the present disclosure provide a data transmitting method. The method includes a step described below.

A grant-free resource is selected to send a data packet.

The grant-free resource is K continuous time slots of a frequency band, where the K is an integer greater than 0.

The embodiments of the present disclosure further provide a feedback method. The method includes a step described below.

At least one of the following is fed back through a terminal-device-specific signal:

data packet decoding success or data packet decoding failure.

The embodiments of the present disclosure further provide a data transmitting apparatus.

The apparatus includes a selecting module and a transmitting module.

The selecting module is configured to select a grant-free resource.

The transmitting module is configured to send a data packet using the selected grant-free resource.

The grant-free resource is K continuous time slots of a frequency band, where the K is an integer greater than 0.

The embodiments of the present disclosure further provide a feedback apparatus. The apparatus includes a notification module and a feedback module.

The notification module is configured to notify the feedback module.

The feedback module is configured to, in response to receiving the notification, feed back one of the following through a terminal-device-specific signal: data packet decoding success or data packet decoding failure.

The embodiments of the present disclosure provide a computer-readable storage medium, which is configured to store computer programs that, when executed by a processor, implement steps of the above-mentioned data transmitting method, or implement steps of the above-mentioned data feedback method.

The embodiments of the present disclosure provide a data transmitting device. The device includes a memory and a processor. The memory is configured to store computer programs executable by the processor and the processor is configured to implement steps of the above-mentioned data transmitting method when the programs are executed by the processor.

The embodiments of the present disclosure provide a data feedback device. The device includes a memory and a processor. The memory is configured to store computer programs executable by the processor and the processor is configured to implement steps of the above-mentioned data feedback method when the programs are executed by the processor.

In the data transmitting method and apparatus, the device and the storage medium provided by the embodiments of the present disclosure, a grant-free resource is selected for transmitting a data packet. The grant-free resource is K continuous time slots of one frequency band, where the K is an integer greater than 0. In this way, a manner for setting an uplink grant-free resource is provided, so that a terminal device can better utilize the grant-free resource. In addition, according to this method, one grant-free resource can support K retransmissions of one data packet at most, which improves reliability of the data packet transmission in a grant-free manner.

In addition, in the feedback method and apparatus, the device and the storage medium provided by the embodiments of the present disclosure, at least one of the following is fed back through a terminal-device-specific signal: data packet decoding success or data packet decoding failure. In this way, the terminal device does not need demodulation and decoding processes, and can determine whether the data packet is successfully decoded only by detecting a receiving energy of the terminal-device-specific signal, thereby reducing power loss when the terminal device receives feedback.

DETAILED DESCRIPTION

The present disclosure will be described with reference to the drawings and embodiments. It is to be understood that the embodiments described herein are intended to explain and not to limit the present disclosure.

An embodiment of the present disclosure provides a data transmitting method and apparatus, which can be applied in a terminal device. The terminal device may be a device that is in a wireless communication connection with a network side device (e.g., a base station), which, for example, may be a mobile terminal or the like. In this embodiment, the wireless communications technology used by the terminal device or the type of wireless communications network accessed by the terminal device is not limited.

The terminal device may include a transmitter used for transmitting a signal to a network side and a receiver used for receiving a network side signal. The receiver may use the Successive Interference Cancellation (SIC) technology to improve receiving performance.

In the practical implementation, a grant-free resource pool may be pre-configured for the terminal device. The grant-free resource pool is a set of grant-free resources. One grant-free resource may be one time-frequency resource.

The terminal device may use the grant-free resource to send a data packet. The size, type or the like of the data packet sent by the terminal device is not limited in this embodiment. In the practical implementation, the terminal device, after acquiring a data packet to be sent, selects a grant-free resource in the pre-configured grant-free resource pool to send the data packet. Different terminal devices are allowed to share the same set of grant-free resources.

The following embodiments are proposed based on the terminal device, the grant-free resource and the like described above.

First Embodiment

The first embodiment of the present disclosure provides a data transmitting method. The method may be applied in the terminal device.

Figure 1:
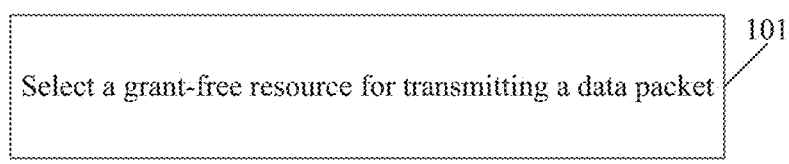
FIG. 1 is a flowchart of a data transmitting method according to the first embodiment of the present disclosure.

FIG. 1 is a flowchart of a data transmitting method according to the first embodiment of the present disclosure. As shown in FIG. 1, the method may include the following step.

In step 101, a grant-free resource is selected to send a data packet.

The grant-free resource is K continuous time slots of a frequency band, where the K is an integer greater than 0.

In this way, a manner for setting an uplink grant-free resource is provided, so that the terminal device can better utilize the grant-free resource; in addition, according to this method, one grant-free resource can support K retransmissions of the data packet at most, which improves reliability of transmitting the data packet in a grant-free manner. In other embodiments, a solution using the grant-free resource is given for uplink grant-free sending in an Ultra-Reliable and Low Latency Communications (URLLC) scenario.

In one embodiment, an index of a hybrid automatic repeated request (HARQ) process used by the data packet is 0 or 1. In other words, the terminal device supports two HARQ processes at most. For example, in a case where the terminal device supports one HARQ process, the index of the HARQ process used by the data packet is fixed at 1; in a case where the terminal device supports two HARQ processes, the index of the HARQ process used by the data packet is 1 or 0. This method adapts to a traffic characteristic of low traffic during the grant-free transmitting, and simplifies complexity of HARQ process identification during the grant-free transmitting.

In one embodiment, the frequency band described above is one of the following:

a pre-configured frequency band or one of multiple pre-configured frequency bands.

The one of multiple pre-configured frequency bands means that the frequency band is one of the multiple frequency bands, and the multiple frequency bands are pre-configured.

It is to be noted that the pre-configured frequency band or the multiple pre-configured frequency bands are all logical frequency bands, and one logical frequency band in different time slots may correspond to the same or different physical frequency bands. The time slot (sometimes also referred to as micro time slot) is an available or usable time slot (i.e., a logical time slot). In other words, the K continuous time slots may be K physically continuous time slots or K physically non-continuous time slots. The time slot is a time unit occupied by a transmission of one data packet, and one grant-free resource including K continuous time slots can support K continuous retransmissions of one data packet at most.

In one embodiment, when the frequency band is the pre-configured frequency band, the first time slot in the K continuous time slots is one of the following: any one of all time slots of the frequency band or a time slot in the first time slot set of the frequency band.

A manner of setting the first time slot set is illustrated below. A time slot index $I_{slot}$ of the time slot in the first time slot set meets a following condition:

$$I_{slot} \bmod K = n \cdot (K/N), n=0,1,2,\ldots,N-1,$$

where the N is an integer greater than 0. In this embodiment, mod denotes the modulo function.

It can be seen that if the first time slot in the K continuous time slots is any one of all time slots of the frequency band, the transmitting delay of the data packet may be minimized; if the first time slot in the K continuous time slots is a time slot in the first time slot set of the frequency band, a grant-free resource can only start at a specific time slot of each K continuous time slots of this frequency band, thereby supporting HARQ combination. With combination with an advanced termination mechanism (i.e., when a data packet is successfully received by a network, the terminal device terminates the transmission of the data packet on the grant-free resource early), the probability of collision among last several ones in the K continuous time slots included in one grant-free resource is smaller, thereby improving receiving performance of the terminal device.

In one embodiment, when the frequency band is the x-th frequency band in the multiple pre-configured frequency bands, the first time slot in the K continuous time slots is a time slot in the second time slot set of the x-th frequency band, where the x is an integer greater than 0 and less than X, and the X denotes the number of the multiple pre-configured frequency bands.

A time slot index $I_{slot(2)}$ of the time slot in the second time slot set meets a following condition:

$$I_{slot(2)} \bmod K = (x-1) \cdot (K/X)$$

It can be seen that if the first time slot in the K continuous time slots is a time slot in the second time slot set of the x-th frequency band, a grant-free resource can only start at a specific time slot of each K continuous time slots of this frequency band, thereby supporting HARQ combination. With combination with the advanced termination mechanism (i.e., when a data packet is successfully received by the network, the terminal device terminates the transmission of the data packet on the grant-free resource early), the probability of collision among last several ones in the K continuous time slots included in a grant-free resource is smaller, thereby improving the receiving performance of the terminal device.

It is to be noted that the time slot index is an index of a time slot in all time slots of P continuous wireless frames. For example, assuming that each wireless frame includes Q continuous time slots, the P continuous wireless frames include P×Q continuous time slots; for the q-th time slot in the p-th wireless frame, its corresponding time slot index is (p−1)×Q+q−1, where the P and Q are integers greater than 0, the p is an integer greater than or equal to 1 and less than or equal to P, and the q is an integer greater than or equal to 1 and less than or equal to Q.

In one embodiment, the step in which a grant-free resource is selected to send a data packet includes: when the frequency band is one of the multiple pre-configured frequency bands, selecting a grant-free resource for transmitting the data packet according to an arriving time of the data packet.

In the practical implementation, the grant-free resource for transmitting the data packet is one of all grant-free resources of the multiple pre-configured frequency bands that is located after the arriving time of the data packet and is closest to the arriving time of the data packet. In this way, the terminal device can select a grant-free resource with the minimum transmitting delay according to the arriving time of the data packet to send the data packet, reducing data packet transmitting delay.

In other embodiments, after the first time slot of the grant-free resource, feedback from a network side can further be received. The feedback includes at least one of the following: a terminal-device-specific signal, downlink control information for uplink grant, or common downlink control information.

The network side may be a device such as a base station, the terminal-device-specific signal is a signal pre-configured by the network side device for each terminal, and the terminal-device-specific signal is only sent to a corresponding terminal device.

When the feedback includes the downlink control information for uplink grant, the downlink control information for uplink grant includes uplink grant information of the terminal device, which is configured to assign to the terminal device an uplink grant resource that can be used for retransmitting the data packet. The downlink control information for uplink grant may include uplink grant information of one terminal device, and also may include uplink grant information of multiple terminal devices.

For example, the downlink control information for uplink grant is allowed to only include uplink grant information of a unique terminal device (when it needs to provide uplink grant information for multiple terminal devices, multiple terminal devices are provided with different downlink control information); alternatively, the downlink control information for uplink grant is allowed to include uplink grant information of multiple terminal devices (when only one terminal device needs to be provided with uplink grant information, the downlink control information for uplink grant includes only uplink grant information of one terminal device, and when multiple terminal devices need to be provided with uplink grant information, the downlink control information for uplink grant includes uplink grant information of multiple terminal devices).

When the feedback includes the common downlink control information, the common downlink control information is located in a common search space or in a group search space, and the size of the common downlink control information is equal to the size of the downlink control information for uplink grant.

In this embodiment, for the time to receive the feedback from the network side, in an example, the feedback from the network side can be received in a set time after the first time slot of the grant-free resource.

In the practical implementation, the set time includes at least one of the following:

the third preset time slot after the grant-free resource; or the set time starts from the first preset time slot after the first time slot of the grant-free resource ends at the second preset time slot before the last one time slot of the grant-free resource.

The second time slot is located after the first time slot, and in this embodiment, the third time slot is not limited, and it only requires to ensure that the third time slot is located after the grant-free resource.

It is to be noted that receiving the feedback from the network side in the third time slot after the grant-free resource is equivalent to adopting synchronous feedback timing, which is beneficial to reducing delay and blind detection times.

Preferably, the downlink control information for uplink grant may contain a new data packet indicator.

The new data packet indicator is used for indicating whether the downlink control information for uplink grant is used for resource grant for data packet initial transmission or resource grant for data packet retransmission.

When the feedback includes the common downlink control information, the common downlink control information is used for simultaneously indicating, to each of multiple terminal devices, a receiving state of a data packet of the each of the multiple of terminal devices.

The receiving state includes at least one of the following: data packet decoding succeeds, data packet decoding fails, a data packet is detected but decoding fails, or the data packet is not detected.

That is, the network side can feed back a state of the network side receiving the data packet to a corresponding terminal device through the common downlink control information. For example, after the terminal device starts to send a data packet 1 to the network side, the network side can send common downlink control information to the terminal device, and the common downlink control information indicates that the network side receives the data packet but the decoding fails.

In other embodiment, when the common downlink control information indicates that the receiving state of the data packet is that the data packet is detected but decoding fails, the common downlink control information is further used for indicating at least one of following information: an adjustment amount of the transmit power of the terminal device, or a retransmission resource index, where the retransmission resource belongs to a set of pre-configured retransmission resources.

That is, if the state of the network side receiving the data packet is that the data packet is detected but the decoding fails, the common downlink control information can be sent to the terminal device, and the receiving state of the network side receiving the data packet and corresponding processing performed by the terminal device (e.g., adjusting the transmit power of the terminal device or using the retransmission resource to re-upload the data packet) are indicated in the sent common downlink control information.

When the common downlink control information is used for indicating the adjustment amount of the transmit power of the terminal device, the terminal device can adjust transmit power according to the adjustment amount. Depending on the power adjustment of the terminal device, a receive power difference between different terminal devices can be achieved, improving the receiver performance using SIC.

In other embodiments, a cyclic redundancy check (CRC) scrambling identifier of the common downlink control information can be determined according to at least one of manners: setting a fixed CRC scrambling identifier, using a pre-configured CRC scrambling identifier, or determining the CRC scrambling identifier according to an index of a grant-free resource pool in which the grant-free resource is located.

In the practical implementation, the step of determining the CRC scrambling identifier according to an index of a grant-free resource pool in which the grant-free resource is located includes: corresponding each of different grant-free resource pools to a respective one of different common downlink control information.

The CRC scrambling identifier of the common downlink control information can be determined by adopting a combining manner. For example, in a case of pre-configuring no CRC scrambling identifier (i.e., default), the fixed CRC scrambling identifier is adopted, otherwise the pre-configured CRC scrambling identifier is adopted.

In other embodiments, when the feedback includes the common downlink control information, a location of feedback information corresponding to the terminal device in the common downlink control information according to at least one of manners: adopting a pre-configured location of the feedback information corresponding to the terminal device, or determining the location of the feedback information corresponding to the terminal device according to an index of a demodulation reference signal preconfigured to the terminal device.

The location of feedback information corresponding to the terminal device in the common downlink control information can be determined adopting a combining manner. For example, in a case of no location of feedback information corresponding to the pre-configured terminal device (i.e., default), the location of the feedback information corresponding to the terminal device in the common downlink control information is determined according to the index of the demodulation reference signal, otherwise the pre-configured location of feedback information corresponding to the terminal device is adopted.

The resource utilization efficiency of feedback can be improved by adopting the common downlink control information to perform feedback.

The step of determining the location of the feedback information corresponding to the terminal device in the common downlink control information according to the index of the demodulation reference signal includes: in a case in which different grant-free resource pools and different common downlink control information are in one-to-one correspondence, corresponding each of different demodulation reference signals to a respective one of different information locations.

In one embodiment, when the feedback includes the terminal-device-specific signal, the terminal-device-specific signal is used for indicating to the terminal device that the data packet decoding succeeds. For example, if the terminal device detects the terminal-device-specific signal, it can be determined that the network side receives the data packet and the data packet is decoded successfully. In other words, the network side device sends the terminal-device-specific signal to the terminal device only when it is determined that the data packet is decoded successfully; otherwise, the network side does not to send the terminal-device-specific signal to the terminal device. Accordingly, the terminal device determines that the data packet is decoded successfully when the terminal-device-specific signal is detected successfully; otherwise, the terminal device determines that the data packet decoding fails. The manner of the terminal device detecting the terminal-device-specific signal includes: when a receiving energy of the terminal-device-specific signal exceeds a set or pre-configured threshold, determining that the terminal-device-specific signal is detected; otherwise, determining that no terminal-device-specific signal is detected. In this way, the terminal device does not need demodulation and decoding processes, and can determine whether the data packet is successfully decoded only by detecting the receiving energy of the terminal-device-specific signal, thereby reducing power loss when the terminal device receives feedback.

In other embodiment, when the feedback includes the terminal-device-specific signal, at least one of the following is determined through a pre-configured manner:

a sequence used by the terminal device-specific signal; or a time-frequency resource allowed to be used for transmitting the terminal-device-specific signal.

The sequence used by the terminal device-specific signal may be one of the following:

a pseudo-noise (PN) sequence, a Zadoff-Chu sequence, a cyclic extension sequence of a Zadoff-Chu sequence, a product of a Zadoff-Chu sequence and a PN sequence, or a product of a cyclic extension sequence of a Zadoff-Chu sequence and a PN sequence.

As an implementation manner, when the length value of the sequence used by the terminal device-specific signal is a prime number (e.g., 11 or 61, etc.), the type (or form) of the sequence used by the terminal device-specific signal is the Zadoff-Chu sequence or the product of a Zadoff-Chu sequence and a PN sequence.

Otherwise, the type (or form) of the sequence used by the terminal-device-specific signal is the PN sequence, or the cyclic extension sequence of a Zadoff-Chu sequence, or the product of a cyclic extension sequence of a Zadoff-Chu sequence and a PN sequence.

In this embodiment, a pre-configured implementation manner is exemplarily described below. The pre-configuration manner of the terminal device by the network side includes at least one of the following: pre-configuration through dynamic signaling, pre-configuration through broadcast signaling, or configuration through a terminal-device-specific radio resource control (RRC) message.

The above dynamic signaling may be specific to one terminal device, and may also be specific to a group of terminal devices. Preferably, the dynamic signaling may include downlink control information signaling.

As an implementation manner, it can be configured in a time-frequency resource (e.g., configured as the first available resource block in a system broadband) allowed to be used for transmitting the terminal-device-specific signal in a time slot of feedback through the terminal-device-specific RRC message. A parameter related to a terminal-device-specific signal sequence can be configured to the terminal device through the terminal-device-specific RRC message. The related parameter includes one of the following: an index of the sequence used by the terminal-device-specific signal in a set sequence set, where the set sequence set is a set composed of all sequences that the terminal device-specific can use; or a set parameter, where the sequence used by the terminal-device-specific signal can be calculated according to the set parameter.

After the feedback from the network side is received, the transmitting process of the data packet can be processed according to the feedback by adopting following manners.

The first manner:

After the feedback from the network side is received, when the first condition is met, the transmission of the data packet is terminated early.

The first condition includes at least one of the following:

the feedback from the network side is received in a time interval from the first preset time slot after the first time slot of the grant-free resource to the second preset time slot before the last time slot of the grant-free resource; or the feedback is the common downlink control information, and the common downlink control information indicates that the receiving state of the data packet is that decoding succeeds.

The second manner:

After the feedback from the network side is received, when the second condition is met, the data packet is retransmitted in a preset retransmission resource.

The second condition includes at least one of the following:

the feedback from the network side is received in the third preset time slot after the grant-free resource; or the feedback is the common downlink control information, the common downlink control information indicates that the receiving state of the data packet is one of the following: decoding fails, a data packet is detected but decoding fails, or the data packet is not detected, and when the receiving state is that the data packet is detected but decoding fails, the common downlink control information does not contain indication information of a retransmission resource index.

In the practical implementation, the preset retransmission resource meets at least one of the following:

a frequency band occupied by the preset retransmission resource is a same as a frequency band of the gran-free resource;

the preset retransmission resource includes K continuous time slots; or the preset retransmission resource, by default, starts at the fourth preset time slot after a time slot in which received the feedback is received.

The location relationship between the fourth preset time slot and other preset time slots is not limited herein as long as it ensures that the fourth time slot is located after the time slot of feedback.

The third manner:

After the feedback from the network side is received, when the third condition is met, the data packet is retransmitted in a resource indicated a retransmission resource index.

The third condition includes that the feedback is the common downlink control information, and the common downlink control information contains indication information of the retransmission resource index.

The third condition further includes at least one of the following:

the feedback from the network side is received in the third preset time slot after the grant-free resource; or the common downlink control information indicates that the receiving state of the data packet is that the data packet is detected but decoding fails.

In the practical implementation, the resource indicated by the retransmission resource index meets at least one of the following:

the resource indicated by the retransmission resource index includes K continuous time slots; or the resource indicated by the retransmission resource index starts, by default, at the fifth preset time slot after a time slot in which the feedback is received.

The location relationship between the fifth preset time slot and other preset time slots is not limited herein as long as it ensures that the fifth time slot is located after the time slot of feedback.

The fourth manner:

After the feedback from the network side is received, when the fourth condition is met, the transmission of the data packet on the grant-free resource is terminated early, and the data packet is retransmitted on a resource indicated by a retransmission resource index.

The fourth condition includes that the feedback is the common downlink control information, and the common downlink control information contains indication information of the retransmission resource index.

The fourth condition further includes at least one of the following:

the feedback from the network side is received in a time interval from the first preset time slot after the first time slot of the grant-free resource to the second preset time slot before the last time slot of the grant-free resource; or the common downlink control information indicates that the receiving state of the data packet is that the data packet is detected but decoding failure occurs.

The resource indicated by the retransmission resource index meets at least one of the following:

the resource indicated by the retransmission resource index, by default, starts at the sixth preset time slot after a time slot in which the feedback is received, and ends up with the last time slot of the grant-free resource; or the resource indicated by the retransmission resource index includes K continuous time slots, and starts at the sixth preset time slot after a time slot in which the feedback is received by default.

The location relationship between the sixth preset time slot and other preset time slots is not limited herein as long as it ensures that the sixth time slot is located after the time slot of feedback.

For the fourth manner, in an optional embodiment, the step in which the transmission of the data packet on the grant-free resource is terminated early may include:

terminating the transmission of the data packet on the grant-free resource early in the first time slot before the resource indicated by the retransmission resource index by default.

The fifth manner:

After the feedback from the network side is received, when the fifth condition is met, the data packet is retransmitted on a resource indicated by the downlink control information for uplink grant.

The fifth condition includes that the feedback is received in the third preset time slot after the grant-free resource, and the feedback is used for the downlink control information for uplink grant.

The sixth manner:

After the feedback from the network side is received, when the sixth condition is met, the transmission of the data packet on the grant-free resource is terminated early, and the data packet is retransmitted on a resource indicated by the downlink control information for uplink grant.

The sixth condition includes that: the feedback from the network side is received in a time interval from the first preset time slot after the first time slot of the grant-free resource to the second preset time slot before the last time slot of the grant-free resource, and the feedback from the network side is received, and the feedback is used for the downlink control information for uplink grant.

For the sixth manner, in an optional embodiment, the step in which the transmission of the data packet on the grant-free resource is terminated early may include:

terminating the transmission of the data packet on the grant-free resource early in the first time slot before a default uplink granted resource; or terminating the transmission of the data packet on the grant-free resource early in the eighth preset time slot after the time slot in which the feedback is received; or indicating, through downlink control information, a time slot in which the transmission of the data packet on the grant-free resource is terminated early, and terminating the transmission of the data packet on the grant-free resource early in the indicated termination time slot.

The location relationship between the eighth preset time slot and other preset time slots is not limited herein as long as it ensures that the eighth time slot is located after the time slot of feedback.

For the fifth manner and the sixth manner, in an optional embodiment, the resource indicated by the downlink control information for uplink grant meets at least one of the following:

the resource indicated by the downlink control information for uplink grant includes Z continuous time slots, where the Z is an integer greater than 0 and a value of the Z is indicated through the downlink control information for uplink grant; or the resource indicated by the downlink control information for uplink grant by default starts at the seventh time slot after a time slot in which the feedback is received, or is indicated through the downlink control information for uplink grant.

The value of Z is independent of the value of K, and the location relationship between the seventh preset time slot and other preset time slots is not limited herein as long as it ensures that the seventh time slot is located after the time slot of feedback.

Particularly, when the terminal device receives simultaneously the downlink control information for uplink grant and the common downlink control information, the common downlink control information is neglected, and the data packet is retransmitted according to the downlink control information for uplink grant. In other words, compared with the common downlink control information, a priority of using the downlink control information for uplink grant is higher. It is to be noted that if the downlink control information for uplink grant is received from the first preset time slot after the first time slot of the grant-free resource to the second preset time slot before the last time slot of the grant-free resource, the operation of the terminal device further includes terminating the transmission of the data packet on the grant-free resource early.

In one embodiment, after the grant-free resource, the terminal device may no longer receive the feedback, or determine whether to receive the feedback according to the magnitude of the K. For example, when whether to receive the feedback is determined according to the value of the K, if K is greater than a set threshold or a pre-configured threshold, the feedback is not received, otherwise the terminal device can receive the feedback.

Second Embodiment

On the basis of the first embodiment of the present disclosure, this embodiment will be described exemplarily.

Figure 2:
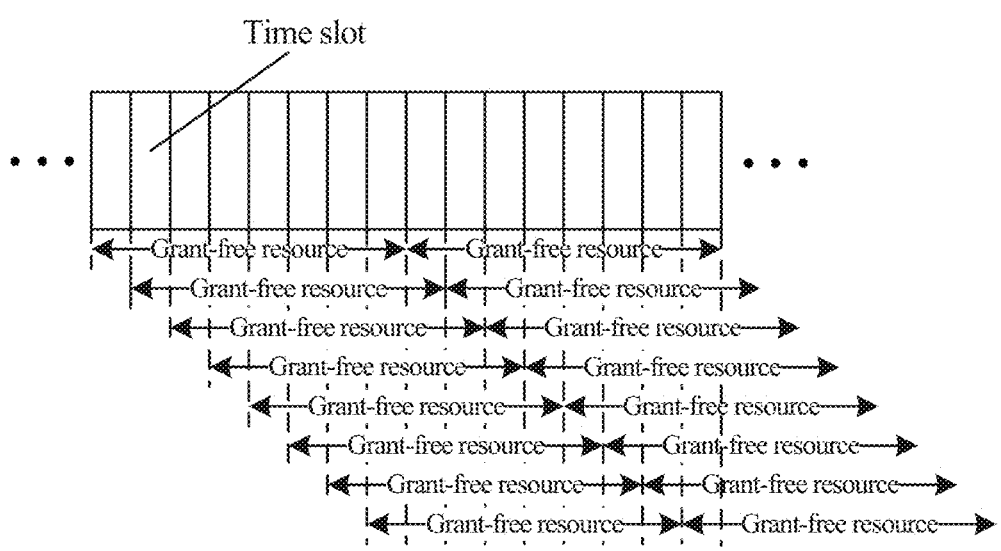
FIG. 2 is a schematic diagram of a grant-free resource according to the second embodiment of the present disclosure.

FIG. 2 is a schematic diagram of a grant-free resource according to the second embodiment of the present disclosure.

As shown in FIG. 2, all available grant-free resources are located in the same frequency band. This frequency band is pre-configured to the terminal device, and for example, frequency band information in which a grant-free resource is located is configured to the terminal device through a terminal device-specific RRC message. Any one of grant-free resources includes eight continuous time slots (i.e., K=8) of this frequency band. Any one of time slots of the frequency band can be used as the first time slot of the eight continuous time slots included in one grant-free resource, that is, one grant-free resource may start at any one of time slots of this frequency band.

Based on the second embodiment of the present disclosure, when the grant-free resource is adopted to send a data packet, since any one of time slots corresponding to the frequency band can be used as the first time slot of the grant-free resource, the transmitting delay of the data packet can be minimized. The defect of the second embodiment of the present disclosure is that: the HARQ combination is not supported due to the uncertainty of the first time slot of the grant-free resource, and in addition, the network side cannot determine the final termination time of the K continuous time slots due to the uncertainty of the first time slot of the grant-free resource, so that it is not easy to determine whether to trigger retransmission currently.

Third Embodiment

On the basis of the first embodiment of the present disclosure, this embodiment will be described exemplarily.

Figure 3:
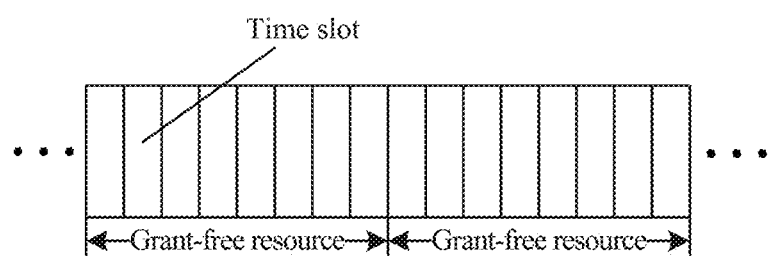
FIG. 3 is a schematic diagram of a grant-free resource according to the third embodiment of the present disclosure.

FIG. 3 is a schematic diagram of a grant-free resource according to the third embodiment of the present disclosure. As shown in FIG. 3, all available grant-free resources are located in the same frequency band. This frequency band is pre-configured to the terminal device, and for example, frequency band information in which a grant-free resource is located is configured to the terminal device through a terminal-device-specific RRC message. Any one of grant-free resources includes eight continuous time slots (i.e., K=8) of this frequency band. A time slot of the frequency band that meets the following condition can be used as the first time slot of the eight continuous time slots included in one grant-free resource.

$$I_{slot} \bmod K = I_{slot} \bmod 8 = 0$$

The $I_{slot}$ denotes a time slot index of the first time slot in the eighth continuous time slots included in one grant-free resource. That is, one grant-free resource can only start at the first time slot of each eight continuous time slots of this frequency band.

Based on the third embodiment of the present disclosure, when the grant-free resource is adopted to send a data packet, one grant-free resource can only start at a specific time slot of each eight continuous time slots of this frequency band, which can support the HARQ combination. With combination with an advanced termination mechanism (i.e., when a data packet is successfully received by a network, the terminal device terminates the transmission of the data packet on the grant-free resource early), the probability of collision among last several time slots in the K continuous time slots included on one grant-free resource is smaller, thereby improving the receiving performance of the terminal device.

Fourth Embodiment

Figure 4:
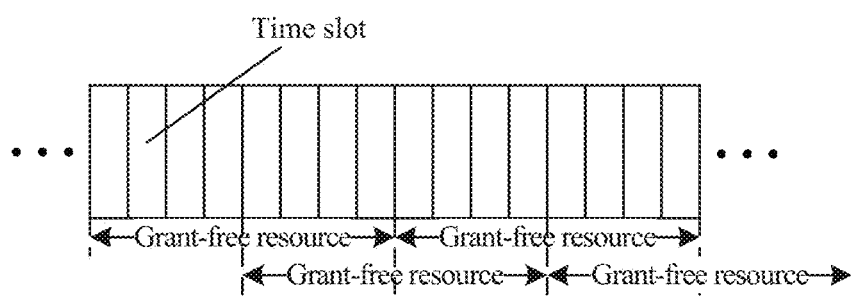
FIG. 4 is a schematic diagram of a grant-free resource according to the fourth embodiment of the present disclosure.

FIG. 4 is a schematic diagram of a grant-free resource according to the fourth embodiment of the present disclosure. As shown in FIG. 4, all available grant-free resources are located in the same frequency band. This frequency band is pre-configured to the terminal device, and for example, frequency band information in which a grant-free resource is located is configured to the terminal device through a terminal device-specific RRC message. Any one of grant-free resources includes eight continuous time slots (i.e., K=8) of this frequency band. A time slot of the frequency band that meets the following condition can be used as the first time slot of the eight continuous time slots included in one grant-free resource.

$$I_{slot} \bmod K = I_{slot} \bmod 8 = 4n, n=0,1$$

The $I_{slot}$ denotes a time slot index of the first time slot in the eighth continuous time slots included in one grant-free resource. That is, one grant-free resource can only start at the first time slot of each four continuous time slots of this frequency band.

The fourth embodiment of the present disclosure is a compromise solution of the second embodiment and the third embodiment of the present disclosure. That is, the fourth embodiment considers both the reduction of the transmitting delay of the data packet and the support for the HARQ combination.

Fifth Embodiment

Figure 5:
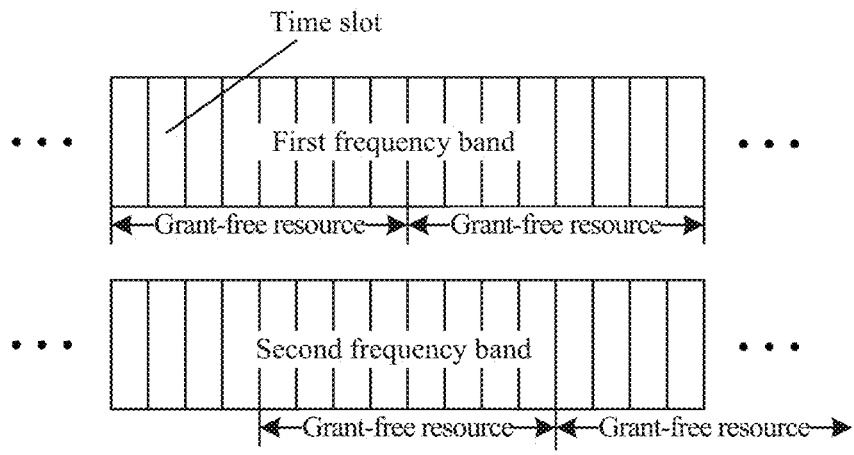
FIG. 5 is a schematic diagram of a grant-free resource according to the fifth embodiment of the present disclosure.

FIG. 5 is a schematic diagram of a grant-free resource according to the fifth embodiment of the present disclosure. As shown in FIG. 5, all available grant-free resources are distributed in two frequency bands (i.e., a grant-free resource pool in which grant-free resources are located includes two frequency bands). The two frequency bands are pre-configured to the terminal device, and for example, location information of the two frequency bands in which grant-free resources are located is configured to the terminal device through a terminal-device-specific RRC message. Any one of grant-free resources includes eight continuous time slots (i.e., K=8) of the first or the second frequency band.

A time slot of the first frequency band that meets the following condition can be used as the first time slot in the eight continuous time slots included in one grant-free resource of the first frequency band.

$$I_{slot}^1 \bmod K = I_{slot}^1 \bmod 8 = 0$$

The $I_{slot}^1$ denotes a time slot index of the first time slot in the eighth continuous time slots included in one grant-free resource of the first frequency band. That is, one grant-free resource of the first frequency band can only start at the first time slot of each eight continuous time slots of the first frequency band.

A time slot of the second frequency band that meets the following condition can be used as the first time slot in the eight continuous time slots included in one grant-free resource of the second frequency band.

$$I_{slot}^2 \bmod K = I_{slot}^2 \bmod 8 = 4$$

The $I_{slot}^2$ denotes a time slot index of the first time slot in the eighth continuous time slots included in one grant-free resource of the second frequency band. That is, one grant-free resource of the second frequency band can only start at the fifth time slot of each eight continuous time slots of the second frequency band.

Based on the fifth embodiment of the present disclosure, a start time of one grant-free resource of the first frequency band and a start time of one grant-free resource of the second frequency band has an offset of four fixed time slots. The advantage of this method is to solve problems of the HARQ combination and the data packet transmitting delay. With combination of the advanced termination mechanism, the probability of collision among last several time slots in the K continuous time slots included in one grant-free resource is smaller, thereby improving the receiving performance. The defect is that more frequency bands need to be pre-configured, thereby resulting in relatively lower resource utilization efficiency.

Based on the method shown in this embodiment, the terminal device determines to select which grant-free resource to send the data packet according to the arriving time of the data packet. For example, when the data packet arrives in the second time slot, in all grant-free resources of any one frequency band, a grant-free resource that is after the second time slot and is closest to the second time slot is a grant-free resource, starting at the fifth time slot, of the second frequency. At this point, the terminal device selects the grant-free resource, starting with the fifth time slot, of the second frequency to send the data packet. That is, the terminal device selects a grant-free resource with the minimum transmitting delay to send the data packet according to the data packet arrival time.

Sixth Embodiment

Figure 6:
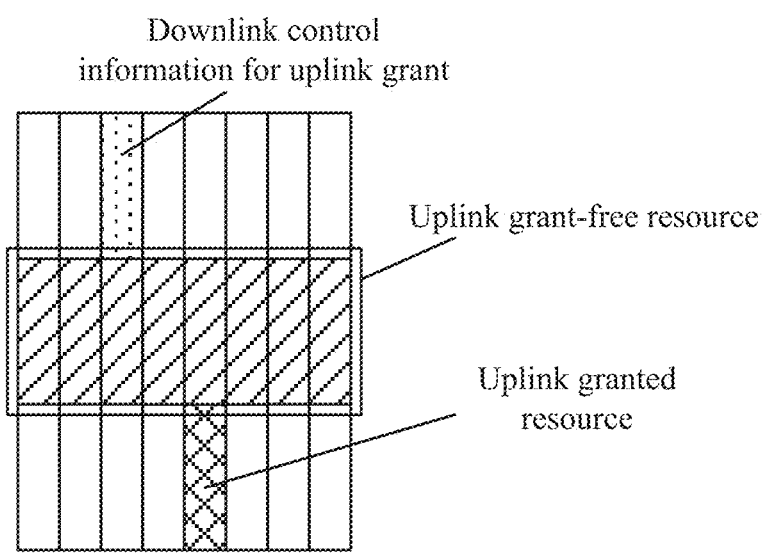
FIG. 6 is a schematic diagram showing that downlink control information for uplink grant triggers a terminal device to retransmit a data packet on a granted resource according to the sixth embodiment of the present disclosure.

FIG. 6 is a schematic diagram showing that downlink control information for uplink grant triggers a terminal device to retransmit a data packet on a granted resource according to the sixth embodiment of the present disclosure. As shown in FIG. 6, a rectangle box filled with scatter points represents the downlink control information for uplink grant, a rectangle box filled with slash lines represents the uplink grant-free resource, and a rectangle box filled with crossover lines represents the uplink grant resource. It can be seen that one grant-free resource includes eight continuous time slots; after the data packet is sent using the first time slot of the grant-free resource, the terminal begins receiving the feedback from the network side in the third time slot of the grant-free resource until the end of the sixth slot of the grant-free resource; and the feedback includes the downlink control information for uplink grant and the common downlink control information.

The downlink control information for uplink grant is used for triggering the terminal device to terminate the transmission of the data packet within the range of the grant-free resource early and to retransmit the data packet on the uplink granted resource. As shown in FIG. 6, the downlink control information for uplink grant is received in the third time slot of the grant-free resource, the uplink granted resource includes only one time slot and starts at the second time slot after the downlink control information for uplink grant by default (i.e., the fifth time slot of the grant-free resource); and the terminal device terminates the transmission of the data packet within the grant-free resource in the first time slot before the uplink granted resource (i.e., the fourth time slot of the grant-free resource) and retransmits the data packet on the uplink granted resource.

The common downlink control information is used for indicating whether the receiving state of the data packet is that decoding succeeds (acknowledgement, ACK) or that decoding fails (negative-acknowledgement, NACK); and if the receiving state of the data packet is ACK, the common downlink control information is further used for triggering the terminal device to immediately terminate the transmission of the data packet within the range of the grant-free resource. The CRC scrambling identifier of the common downlink control information (the terminal device uses this identifier to perform the blink detection on the common downlink control information) is semi-statically configured by the network side to the terminal device.

A location of feedback information corresponding to the terminal device in the common downlink control information is also semi-statically configured to the terminal device. For example, assuming that payload the common downlink control information includes 16 bits, the feedback information corresponding to the terminal device is indicated to be the fourth bit of the 16 bits through a terminal-specific RRC message.

The use of the semi-static configuration manner improves flexibility of network operations, so that the network can adaptively adjust the number of common downlink control information according to the actual service condition and utilize common downlink control information bits more effectively, thereby improving resource unitization efficiency of feedback.

It is to be noted that in this embodiment, the uplink granted resource starts at the second time slot after the downlink control information for uplink grant by default, but it is not limited to this in practice. For example, from the perspective of scheduling flexibility improvement, the start time slot of the uplink granted resource may also be dynamically indicated through the downlink control information for uplink grant. In this case, the transmission of the data packet of the terminal device within the grant-free resource is always terminated early in the first time slot before the uplink granted resource, or is always terminated early in a fixed time slot after the downlink control information for uplink grant (the fixed time slot depends on decoding time required to decode the downlink control information, and for example, if the decoding time is one time slot, the fixed time slot is the second time slot after the downlink control information for uplink grant), or the time slot in which the transmission of the data packet on the grant-free resource is terminated early is indicated through the downlink control information for uplink grant. Considering that the purpose of the network sending the uplink grant is to switch the transmission of the data packet onto the uplink granted resource as soon as possible so as to reduce collision with other data packets, it is better to terminate the transmission of the data packet within the grant-free resource in the fixed time slot after the downlink control information for uplink grant early.

Seventh Embodiment

Figure 7:
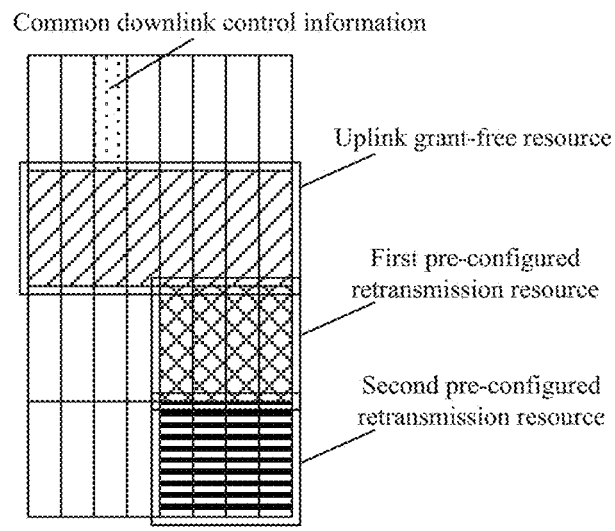
FIG. 7 is a schematic diagram showing that downlink control information for uplink grant triggers a terminal device to retransmit a data packet on a granted resource according to the seventh embodiment of the present disclosure.

FIG. 7 is a schematic diagram showing that common downlink control information triggers a terminal device to retransmit a data packet on a resource indicated by a retransmission resource index according to the seventh embodiment of the present disclosure. As shown in FIG. 7, a rectangle box filled with scatter points represents the common downlink control information, a rectangle box filled with slash lines represents an uplink grant-free resource, a rectangle box filled with crossover lines represents the first pre-configured retransmission resource, and a rectangle box filled with horizontal lines represents the second pre-configured retransmission resource. It can be seen that one grant-free resource includes eight continuous time slots; after the data packet is sent using the first time slot of the grant-free resource, the terminal device begins receiving the feedback from the network side in the third time slot of the grant-free resource until the end of the sixth slot of the grant-free resource; and the feedback includes the downlink control information for uplink grant and the common downlink control information.

The downlink control information for uplink grant is used for triggering the terminal device to terminate the transmission of the data packet within the range of the grant-free resource early and to retransmit the data packet on the uplink granted resource. The example is shown in FIG. 6 (which can refer to corresponding content of the sixth embodiment).

The common downlink control information is used for indicating that the receiving state of the data packet is that decoding succeeds (ACK), or that the data packet is detected but the decoding fails (NACK), or that the data packet is not detected (DTX). If the receiving state of the data packet is ACK, the common downlink control information is further used for triggering the terminal device to immediately terminate the transmission of the data packet within the range of the grant-free resource. If the receiving state of the data packet is NACK, the common downlink control information further indicates the retransmission resource index to the terminal device, and triggers the terminal device to terminate the transmission of the data packet within the range of the grant-free resource and retransmit the data packet on the resource indicated by the retransmission resource index. The retransmission resource belongs to a preconfigured set of retransmission resources. As shown in FIG. 7, the common downlink control information is received in the third time slot of the grant-free resource; the transmission of the data packet of the terminal device within the range of the grant-free resource is terminated in the first time slot after the common downlink control information (i.e., the fourth time slot of the grant-free resource) early; the set of pre-configured retransmission resources includes two retransmission resources (which are the first pre-configured retransmission resource and the second pre-configured retransmission resource), and all start at the second time slot after the common downlink control information (i.e., the fifth time slot of the grant-free resource) and all end in the last time slot of the grant-free resource (i.e., the eighth time slot of the grant-free resource); and a retransmission resource corresponding to the retransmission resource index indicated by the common downlink control information to the terminal device is the first pre-configured retransmission resource, and the terminal device retransmits the data packet on the first pre-configured retransmission resource.

Eighth Embodiment

Figure 8:
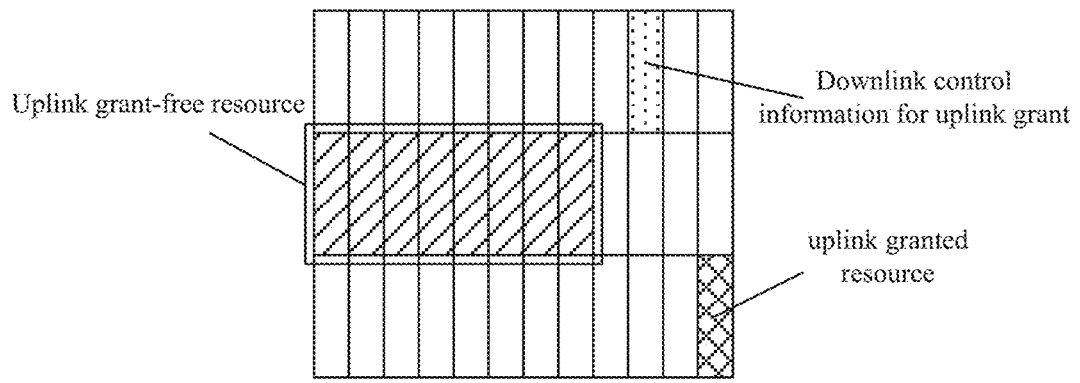
FIG. 8 is a schematic diagram showing that downlink control information for uplink grant triggers a terminal device to retransmit a data packet on a granted resource according to the eighth embodiment of the present disclosure.
Figure 9:
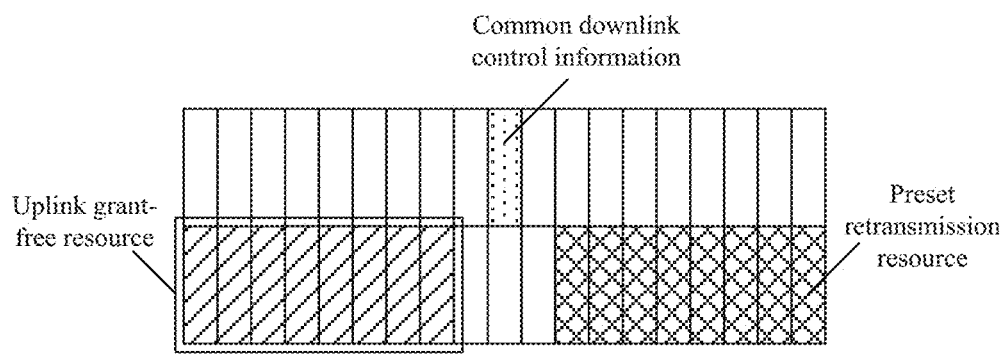
FIG. 9 is a schematic diagram showing that common downlink control information triggers a terminal device to retransmit a data packet on a preset retransmission resource according to the eighth embodiment of the present disclosure.

FIG. 8 is a schematic diagram showing that downlink control information for uplink grant triggers a terminal device to retransmit a data packet on a granted resource according to the eighth embodiment of the present disclosure. In FIG. 8, a rectangle box filled with scatter points represents the downlink control information for uplink grant, a rectangle box filled with slash lines represents the uplink grant-free resource, and a rectangle box filled with crossover lines represents the uplink grant resource. FIG. 9 is a schematic diagram showing that common downlink control information triggers a terminal device to retransmit a data packet on a preset retransmission resource according to the eighth embodiment of the present disclosure. In FIG. 9, a rectangle box filled with scatter points represents the common downlink control information, a rectangle box filled with slash lines represents the uplink grant-free resource, and a rectangle box filled with crossover lines represents the preset retransmission resource. As shown in FIGS. 8 and 9, in this embodiment, one grant-free resource includes eight continuous time slots; after the data packet is sent using the first time slot of the grant-free resource, the terminal receives the feedback from the network side in the second time slot of the grant-free resource; and the feedback includes the downlink control information for uplink grant and the common downlink control information.

The downlink control information for uplink grant is used for triggering the terminal device to retransmit the data packet on the uplink granted resource. As shown in FIG. 8, the downlink control information for uplink grant is received in the second time slot after the grant-free resource, the uplink granted resource includes only one time slot and starts at the second time slot after the downlink control information for uplink grant by default, and the terminal device retransmits the data packet on the uplink granted resource.

The common downlink control information indicates that the receiving state of the data packet is that decoding succeeds (ACK) or that decoding fails (NACK); and if the receiving state of the data packet is NACK, the common downlink control information is further used for triggering the terminal device to retransmit the data packet on the preset retransmission resource. Alternatively, the common downlink control information indicates that the receiving state of the data packet is that decoding succeeds (ACK) or that the data packet is detected but decoding fails (NACK) or that the data packet is not detected (DTX); and if the receiving state of the data packet is NACK or any one of NACK and DTX, the common downlink control information is further used for triggering the terminal device to retransmit the data packet on the preset retransmission resource. As shown in FIG. 9, the common downlink control information is received in the second time slot after the grant-free resource; the preset retransmission resource and the grant-free resource are located on the same frequency band, and both include eight continuous time slots and start at the second time slot after the common downlink control information by default; and the terminal device retransmits the data packet on the preset retransmission resource.

It is to be noted that if both downlink control information feedback for uplink grant and common downlink control information feedback exist in the second time slot after the grant-free resource, the terminal device neglects the common downlink control information feedback (i.e., the priority of the downlink control information feedback for uplink grant is higher). In this way, it helps to reduce collisions between data packets of different terminal devices on the preset retransmission resource.

Ninth Embodiment

Figure 10:
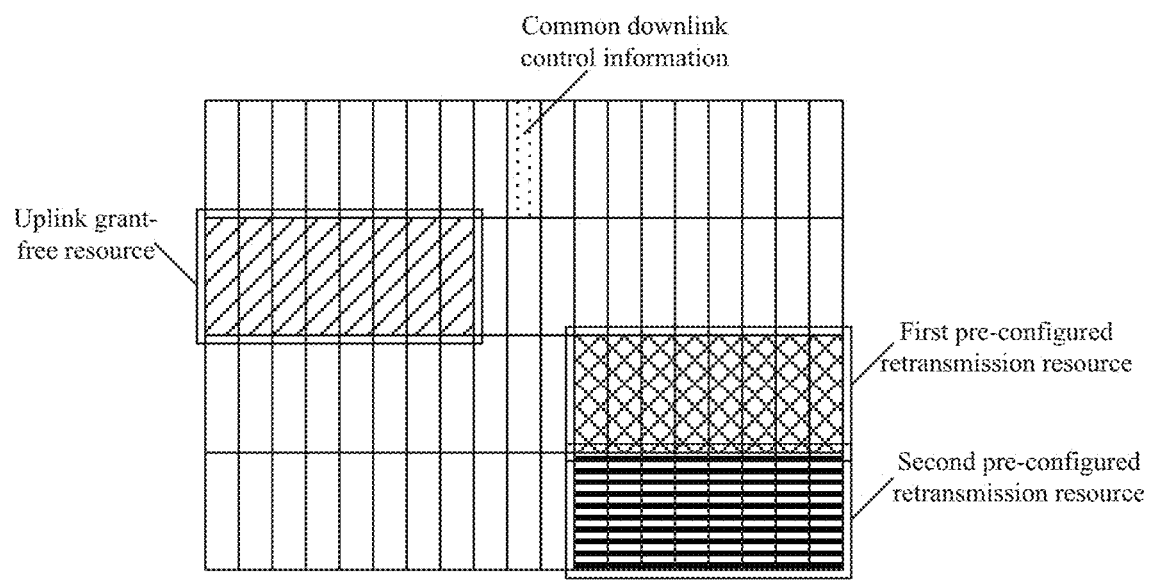
FIG. 10 is a schematic diagram showing that common downlink control information triggers a terminal device to retransmit a data packet on a resource indicated by a retransmission resource index according to the ninth embodiment of the present disclosure.

FIG. 10 is a schematic diagram showing that common downlink control information triggers a terminal device to retransmit a data packet on a resource indicated by a retransmission resource index according to the ninth embodiment of the present disclosure. As shown in FIG. 10, a rectangle box filled with scatter points represents the common downlink control information, a rectangle box filled with slash lines represents an uplink grant-free resource, a rectangle box filled with crossover lines represents the first pre-configured retransmission resource, and a rectangle box filled with horizontal lines represents the second pre-configured retransmission resource. In FIG. 10, in this embodiment, one grant-free resource includes eight continuous time slots; after the data packet is transmitted using the eight continuous time slots of the grant-free resource, the terminal device receives the feedback from the network side in the second time slot after the grant-free resource; and the feedback includes the downlink control information for uplink grant and the common downlink control information.

The downlink control information for uplink grant is used for triggering the terminal device to retransmit the data packet on the uplink granted resource. The example is shown in FIG. 8 (referring to the description of the eighth embodiment of the present disclosure).

The common downlink control information is used for indicating that the receiving state of the data packet is that decoding succeeds (ACK), or that the data packet is detected but the decoding fails (NACK), or that the data packet is not detected (DTX). If the receiving state of the data packet is NACK, the common downlink control information further indicates the retransmission resource index to the terminal device, triggers the terminal device to retransmit the data packet on the resource indicated by the retransmission resource index. The resource indicated by the retransmission resource index belongs to a preconfigured set of retransmission resources. As shown in FIG. 10, the common downlink control information is received in the second time slot after the grant-free resource; the preconfigured set of retransmission resources includes two retransmission resources (which are the first pre-configured retransmission resource and the second pre-configured retransmission resource), and any one of the two retransmission also includes eight continuous time slots and starts at the second time slot after the common downlink control information by default; and a retransmission resource corresponding to the retransmission resource index indicated by the common downlink control information to the terminal device is the first pre-configured retransmission resource, and the terminal device retransmits the data packet on the first pre-configured retransmission resource.

Tenth Embodiment

On the basis of the first embodiment to the ninth embodiment of the present disclosure, the tenth embodiment of the present disclosure provides a data transmitting apparatus. The apparatus is located in a terminal device.

Figure 11:
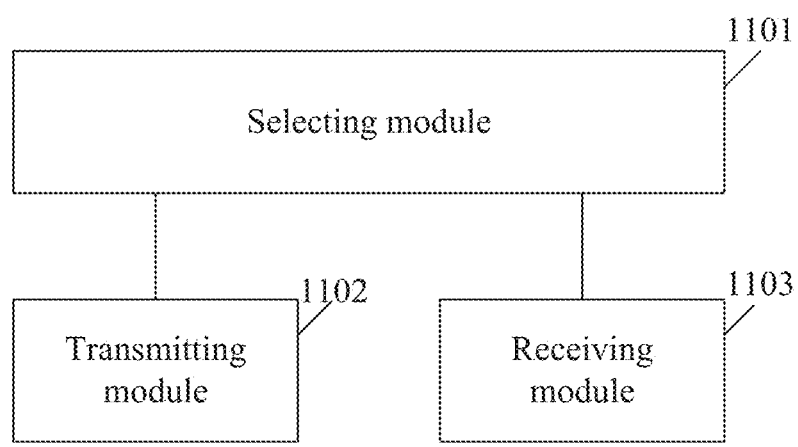
FIG. 11 is a structural diagram of a data transmitting apparatus according to an embodiment of the present disclosure.

FIG. 11 is a structural diagram of a data transmitting apparatus according to an embodiment of the present disclosure. As shown in FIG. 11, the apparatus includes a selecting module 1101 and a transmitting module 1102.

The selecting module 1101 is configured to select a grant-free resource.

The transmitting module 1102 is configured to transmit a data packet using the selected grant-free resource.

The grant-free resource is K continuous time slots of a frequency band, where the K is an integer greater than 0.

In one embodiment, the frequency band is one of the following:

a pre-configured frequency band; or one of multiple pre-configured frequency bands.

In one embodiment, when the frequency band is the pre-configured frequency band, a first time slot in the K continuous time slots is one of the following:

any one of all time slots of the frequency band; or a time slot in a first time slot set of the frequency band.

In one embodiment, a time slot index $I_{slot}$ of the time slot in the first time slot set meets a following condition:

$I_{slot} \mod K = n \cdot (K/N), n=0,1,2,\ldots,N-1$, where the N is an integer greater than 0.

In one embodiment, when the frequency band is the x-th frequency band in the multiple pre-configured frequency bands, the first time slot in the K continuous time slots is a time slot in the second time slot set of the x-th frequency band, where the x is an integer greater than 0 and less than X, and X denotes the number of the multiple pre-configured frequency bands.

In one embodiment, a time slot index $I_{slot(2)}$ of the time slot in the second time slot set meets a following condition:

$I_{slot(2)} \mod K = (x-1) \cdot (K/X)$

In one embodiment, the transmitting module 1102 is configured to, when the frequency band is one of the multiple pre-configured frequency bands, select a grant-free resource for transmitting the data packet according to a time when the data packet arrives.

In one embodiment, the transmitting module 1102 is configured to select, from all grant-free resources of the multiple pre-configured frequency bands, a grant-free resource that is located after the arriving time of the data packet and is closest to the arriving time of the data packet, as the grant-free resource for transmitting the data packet.

In one embodiment, the apparatus further includes a receiving module 1103, which is configured to receive feedback from a network side after the first time slot of the grant-free resource.

The feedback includes at least one of the following: a terminal-device-specific signal, downlink control information for uplink grant, or common downlink control information.

In one embodiment, the receiving module 1103 is configured to receive the feedback from the network side at a set time after the first time slot of the grant-free resource.

The set time includes at least one of the following:

a third preset time slot after the grant-free resource; or set time starts from the first preset time slot after the first time slot of the grant-free resource and ends at the second preset time slot before the last time slot of the grant-free resource.

In one embodiment, the downlink control information for uplink grant includes uplink grant information of one or more terminal devices.

In one embodiment, the common downlink control information is used for simultaneously indicating, to each of multiple terminal devices, a receiving state of a data packet of the each of the multiple of terminal devices.

The receiving state includes at least one of the following: decoding succeeds, decoding fails, a data packet is detected but decoding fails, or the data packet is not detected.

In one embodiment, the receiving module 1103 is further configured to notify the transmitting module after the feedback from the network side is received.

The transmitting module 1102 is further configured to, after receiving the notification, when the first condition is met, terminate the transmission of the data packet early.

The first condition includes at least one of the following:

the feedback from the network side is received in a time interval from the first preset time slot after the first time slot of the grant-free resource to the second preset time slot before the last time slot of the grant-free resource; or the feedback is the common downlink control information, and the common downlink control information indicates that the receiving state of the data packet is that decoding succeeds.

In one embodiment, the receiving module 1103 is further configured to notify the transmitting module after the feedback from the network side is received.

The transmitting module 1102 is further configured to, after receiving a notification, when the second condition is met, retransmit the data packet on a preset retransmission resource.

The second condition includes at least one of the following:

the feedback from the network side is received in the third preset time slot after the grant-free resource; or the feedback is the common downlink control information, the common downlink control information indicates that the receiving state of the data packet is one of the following: decoding fails, a data packet is detected but decoding fails, or the data packet is not detected, and when the receiving state is that the data packet is detected but decoding fails, the common downlink control information does not contain indication information of a retransmission resource index.

In one embodiment, the receiving module 1103 is further configured to notify the transmitting module after the feedback from the network side is received.

The transmitting module 1102 is further configured to, after receiving the notification, when the third condition is met, retransmit the data packet on a resource indicated by a retransmission resource index.

The third condition includes that the feedback is the common downlink control information, and the common downlink control information contains indication information of the retransmission resource index.

The third condition further includes at least one of the following:

the feedback from the network side is received in the third preset time slot after the grant-free resource; or the common downlink control information indicates that the receiving state of the data packet is that the data packet is detected but decoding fails.

In one embodiment, the receiving module 1103 is further configured to notify the transmitting module after the feedback from the network side is received.

The transmitting module 1102 is further configured to, after receiving a notification, when the fourth condition is met, terminate the transmission of the data packet on the grant-free resource early, and retransmit the data packet on a resource indicated by a retransmission resource index.

The fourth condition includes that the feedback is the common downlink control information, and the common downlink control information contains indication information of the retransmission resource index.

The fourth condition further includes at least one of the following:

the feedback from the network side is received from the first preset time slot after the first time slot of the grant-free resource to the second preset time slot before the last time slot of the grant-free resource; or the common downlink control information indicates that the receiving state of the data packet is that the data packet is detected but decoding fails.

In one embodiment, the receiving module 1103 is further configured to notify the transmitting module after the feedback from the network side is received.

The transmitting module 1102 is further configured to, after receiving a notification, when the fifth condition is met, retransmit the data packet on a resource indicated by the downlink control information for uplink grant.

The fifth condition includes that the feedback is received in the third preset time slot after the grant-free resource, and the feedback is used for the downlink control information for uplink grant.

In one embodiment, the receiving module 1103 is further configured to notify the transmitting module after the feedback from the network side is received.

The transmitting module 1102 is further configured to, after receiving a notification, when the sixth condition is met, terminate the transmission of the data packet on the grant-free resource early and retransmit the data packet on a resource indicated by the downlink control information for uplink grant.

The sixth condition includes that: the feedback from the network side is received in a time interval from the first preset time slot after the first time slot of the grant-free resource to the second preset time slot before the last time slot of the grant-free resource, and the feedback is used for the downlink control information for uplink grant.

In the practical application, the selecting module 1101, the transmitting module 1102 and the receiving module 1103 may be implemented by a Central Processing Unit (CPU), a Micro Processor Unit (MPU), a Digital Signal Processor (DSP) or a Field Programmable Gate Array (FPGA) located in the terminal.

Eleventh Embodiment

The eleventh embodiment of the present disclosure provides a feedback method. The method may be applied in a network side device such as a base station.

The feedback method of the eleventh embodiment of the present disclosure may include the following step.

At least one of the following is fed back through a terminal-device-specific signal:

data packet decoding success, or data packet decoding failure.

In one embodiment, the terminal-device-specific signal is sent to a terminal device when it is determined that the data packet is decoded successfully. In other words, the network side device sends the terminal-device-specific signal to the terminal device only when it is determined that the data packet is decoded successfully; otherwise, the network side does not send the terminal-device-specific signal to the terminal device. Accordingly, the terminal device determines that the data packet is decoded successfully when the terminal-device-specific signal is detected successfully; otherwise, the terminal device determines that the decoding of the data packet fails.

In another optional embodiment, the terminal-device-specific signal is sent to a terminal device when it is determined that the decoding of the data packet fails. In other words, the network device sends the terminal-device-specific signal to the terminal device only when it is determined that the decoding of the data packet fails; otherwise, the network side does not to send the terminal-device-specific signal to the terminal device. Accordingly, the terminal device determines that the decoding of the data packet fails when the terminal-device-specific signal is detected successfully; otherwise, the terminal device determines that the data packet is decoded successfully.

The manner of the terminal device detecting the terminal device-specific signal includes: when a receiving energy of the terminal-device-specific signal exceeds a set or pre-configured threshold, determining that the terminal device-specific signal is detected; otherwise, determining that the terminal-device-specific signal is not detected.

At least one of the following is pre-configured:

a sequence used by the terminal device-specific signal; or a time-frequency resource allowed to be used for transmitting the terminal-device-specific signal.

The pre-configuration includes at least one of the following:

pre-configuration through dynamic signaling, pre-configuration through broadcast signaling, or configuration through a terminal device-specific RRC message.

As an implementation manner, a time-frequency resource for transmitting the terminal device-specific signal may be allowed to start by default at a set time slot after the end of one or more transmissions of the data packet (i.e., the fourth time slot), and is configured in a time-frequency resource (e.g., configured as the first available resource block in a system broadband) allowed to be used for transmitting the terminal-device-specific signal in the set time slot through the terminal-device-specific RRC message.

As an implementation manner, a parameter related to a terminal-device-specific signal sequence can be configured to the terminal device through the terminal-device-specific RRC message. The related parameter includes one of the following: an index of the sequence used by the terminal-device-specific signal in a set sequence set, where the set sequence set is a set composed of all sequences that the terminal-device-specific can use; or a set parameter, where the sequence used by the terminal-device-specific signal can be calculated according to the set parameter.

The sequence used by the terminal-device-specific signal may be one of the following:

a PN sequence, a Zadoff-Chu sequence, a cyclic extension sequence of a Zadoff-Chu sequence, a product of a Zadoff-Chu sequence and a PN sequence, or a product of a cyclic extension sequence of a Zadoff-Chu sequence and a PN sequence.

As an implementation manner, when the length value of the sequence used by the terminal device-specific signal is a prime number (e.g., 11 or 61, etc.), the type (or form) of the sequence used by the terminal-device-specific signal is the Zadoff-Chu sequence or the product of a Zadoff-Chu sequence and a PN sequence.

Otherwise, the type (or form) of the sequence used by the terminal-device-specific signal is the PN sequence, or the cyclic extension sequence of a Zadoff-Chu sequence, or the product of a cyclic extension sequence of a Zadoff-Chu sequence and a PN sequence.

It can be seen that after the feedback is performed by adopting the method of the eleventh embodiment of the present disclosure, the terminal device does not need demodulation and decoding processes, and can determine whether the data packet is successfully decoded only by detecting the receiving energy of the terminal-device-specific signal, thereby reducing the power loss when the terminal device receives feedback.

Twelfth Embodiment

On the basis of the eleventh embodiment of the present disclosure, the twelfth embodiment of the present disclosure provides a feedback apparatus. The apparatus is located in a network side device such as a base station.

Figure 12:
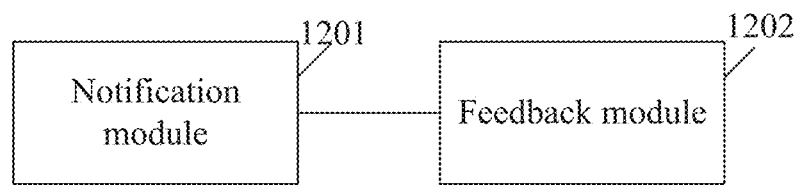
FIG. 12 is a structural diagram of a feedback apparatus according to an embodiment of the present disclosure.

FIG. 12 is a structural diagram of a feedback apparatus according to an embodiment of the present disclosure. As shown in FIG. 12, the apparatus includes a notification module 1201 and a feedback module 1202.

The notification module 1201 is configured to notify the feedback module.

The feedback module 1202 is configured to, after receiving the notification, feed back one of the following through a terminal-device-specific signal: data packet decoding success, or data packet decoding failure.

In the practical application, the notification module 1201 and the feedback module 1202 may be implemented by a Central Processing Unit (CPU), a Micro Processor Unit (MPU), a Digital Signal Processor (DSP) or a Field Programmable Gate Array (FPGA) located in the network side device.

In the embodiments of the present disclosure, the data transmitting method or the feedback method, if implemented in the form of software functional modules and sold or used as independent products, may also be stored in a computer-readable storage medium. Based on this understanding, the technical solutions provided by the embodiments of the present disclosure substantially, or the part contributing to the existing art, may be embodied in the form of a software product. The computer software product is stored in a storage medium and includes several instructions for enabling a computer apparatus (which may be a personal computer, a server or a network apparatus, etc.) to execute all or part of the methods provided by the embodiments of the present disclosure. The foregoing storage medium includes: a USB flash disk, a mobile hard disk, a read only memory (ROM), a magnetic disk, an optical disk or another medium capable of storing program codes. In this way, the embodiment of the present disclosure is not limited to any particular combination of hardware and software.

The embodiments of the present disclosure further provide a computer-readable storage medium, which is configured to store computer programs that, when executed by a processor, implement steps of the above-mentioned data transmitting method, or implement steps of the above-mentioned data feedback method.

Accordingly, the embodiments of the present disclosure provide a data transmitting device. The device includes a memory and a processor. The memory is configured to store computer programs executable by the processor and the processor is configured to implement steps of the above-mentioned data transmitting method when the programs are executed by the processor.

Accordingly, the embodiments of the present disclosure provide a data feedback device. The device includes a memory and a processor. The memory is configured to store computer programs executable by the processor and the processor is configured to implement steps of the above-mentioned data feedback method when the programs are executed by the processor.

A computer program (also referred to as a program, software, software application, script, or code) can be written in any programming language (including an assembly language, interpreted language, descriptive language or programming language), and can be deployed in any form (including as an independent program, or as a module, component, subroutine, object, or another unit suitable for a computing environment). The computer program may, but may not necessarily, correspond to a file in a file system. The program can be stored (e.g., stored in one or more scripts of a markup language document) in a part of the file that holds other programs or data, in a single file dedicated to the program of interest, or in multiple collaborated files (e.g., files storing one or more modules, sub-modules, or portions of code). The computer program can be deployed to be executed on one or more computers that are located at one site, or distributed across multiple sites and interconnected by a communication network.

The processes and logic flows described in the specification can be performed by one or more programmable processors executing one or more computer programs to perform actions by operating input data and generating output. The above processes and logic flows can also be performed by special purpose logic circuitry, and the device can also be implemented as the special purpose logic circuitry, such as an FPGA or an ASIC.

A processor suitable for the execution of a computer program includes, for example, a general purpose microprocessor and a special purpose microprocessor, and any one or more processors of any type of digital computer. Generally, a processor receives instructions and data from a read only memory or a random access memory or both the read only memory and the random access memory. Main elements of computing are a processor for performing actions in accordance with instructions and one or more memories for storing the instructions and data. Generally, a computer further includes one or more mass storage apparatuses (e.g., magnetic disks, magneto-optical disks, or optical disks) for storing data, or is operatively coupled to the one or more mass storage apparatuses for receiving data therefrom, or for transmitting data thereto, or for both receiving data therefrom and transmitting data thereto. However, the computer does not need to have such an apparatus. Moreover, the computer can be embedded into another apparatus, such as a mobile phone, a personal digital assistant (PDA), a mobile audio player or a mobile video player, a game console, a global positioning system (GPS) receiver, or a mobile storage apparatus (e.g., a universal serial bus (USB) flash drive). The above are just examples. An apparatus suitable for storing computer program instructions and data includes all forms of non-volatile memories, media and storage apparatuses, and includes, for example, semiconductor storage apparatuses (e.g., EPROM, EEPROM, and flash memory apparatuses), magnetic disks (e.g., internal hard disks or mobile hard disks), magneto-optical disks, CD-ROM disks and DVD-ROM disks. The processor and memory can be supplemented by or included in special purpose logic circuitry.

The description includes a number of implementation details which are not to be construed as limiting the scope of any claim, but as describing the features specific to the particular embodiments. Particular features described in the specification before and after the independent embodiments can also be implemented in a combination of single embodiments. Conversely, various features that are described in the context of a single embodiment can also be implemented in the multiple embodiments separately or in any suitable sub-combination. Moreover, although features may be described above as acting in a particular combination and even acting as initially required, in some cases one or more features in the required combination can be removed from the combination and the required combination may be a sub-combination or a sub-combination variant.

Similarly, while the operations are depicted in the drawings in a particular order, this should not be construed as requiring that such operations should be performed in the particular order shown or in sequential order, or that all illustrated operations are performed to achieve desirable results. In certain circumstances, multitasking and parallel processing may be advantageous. Moreover, the separation of various system components in the embodiments described above should not be understood as requiring that such separation in all embodiments, and it should be understood that the described program components and systems can generally be integrated together in a single software product or packaged into multiple software products.

Therefore, particular embodiments of the subject matter have been described. Other embodiments are within the scope of the claims described below. In some cases, the actions defined in the claims can be performed in a different order and still achieve desirable results. Moreover, the processes depicted in the drawings are not necessarily performed in the illustrated particular order or sequential order to achieve desirable results. In particular embodiments, multitasking or parallel processing may be used.

INDUSTRIAL APPLICABILITY

In the embodiments, a grant-free resource is selected to transmit a data packet. The grant-free resource is K continuous time slots of one frequency band, where the K is an integer greater than 0. In this way, a manner for setting an uplink grant-free resource is given, so that a terminal device can better utilize the grant-free resource. In addition, according to this method, one grant-free resource can support K retransmissions of a data packet at most, which improves reliability of transmitting a data packet in a grant-free manner. Moreover, at least one of the following is fed back through a terminal-device-specific signal: data packet decoding success or data packet decoding failure. In this way, the terminal device does not need demodulation and decoding processes, and can determine whether the data packet is successfully decoded only by detecting a receiving energy of the terminal-device-specific signal, thereby reducing power loss when the terminal device receives feedback.

What is claimed is:

1. A data transmitting method, comprising:
   selecting a grant-free resource; and
   transmitting a data packet using the selected grant-free resource,
   wherein the grant-free resource is K continuous time slots of a frequency band, wherein the K is an integer greater than 0,
   wherein the method further comprises: receiving feedback from a network side after a first time slot of the grant-free resource, wherein the feedback comprises at least one of: a terminal-device-specific signal, downlink control information for uplink grant, or common downlink control information, and
   wherein after the feedback from the network side is received, the method further comprises: in response to determining that a first condition is met, terminating the transmission of the data packet early, wherein the first condition comprises: the feedback from the network side is received in a time interval from a first preset time slot after the first time slot of the grant-free resource to a second preset time slot before a last time slot of the grant-free resource.

2. The method of claim 1, wherein the frequency band is one of the following:
   a pre-configured frequency band; or
   one of a plurality of pre-configured frequency bands.

3. The method of claim 1, wherein receiving the feedback from the network side after the first time slot of the grant-free resource comprises: receiving the feedback from the network side at a set time after the first time slot of the grant-free resource;
   wherein the set time comprises at least one of the following:
   a third preset time slot after the grant-free resource; or
   from a first preset time slot after the first time slot of the grant-free resource to a second preset time slot before a last time slot of the grant-free resource.

4. The method of claim 1, wherein the downlink control information for uplink grant comprises uplink grant information of one or more terminal devices.

5. The method of claim 1, wherein the common downlink control information is used for simultaneously indicating, to each of a plurality of terminal devices, a receiving state of a data packet of the each of the plurality of terminal devices;
   wherein the receiving state comprises at least one of: decoding succeeds, decoding fails, the data packet is detected but decoding fails, or the data packet is not detected.

6. The method of claim 5, wherein in response to determining that the common downlink control information indicates that the receiving state of the data packet is that the data packet is detected but decoding fails, the common downlink control information is further used for indicating at least one of following information: an adjustment amount of a transmit power of the terminal device or a retransmission resource index, wherein the retransmission resource belongs to a set of pre-configured retransmission resources.

7. The method of claim 1, further comprising: determining a cyclic redundancy check (CRC) scrambling identifier of the common downlink control information according to at least one of the following manners: setting a fixed CRC scrambling identifier, adopting a pre-configured CRC scrambling identifier, or determining the CRC scrambling identifier according to an index of a grant-free resource pool in which the grant-free resource is located.

8. The method of claim 1, further comprising: determining a location of feedback information corresponding to a terminal device in the common downlink control information according to at least one of the following manners: adopting a pre-configured location of the feedback information corresponding to the terminal device, or determining the location of the feedback information corresponding to the terminal device according to an index of a demodulation reference signal pre-configured to the terminal device.

9. The method of claim 1, wherein the terminal-device-specific signal is used for indicating the terminal device that the data packet is decoded successfully.

10. The method of claim 1, wherein the first condition further comprises: the feedback is the common downlink control information, and the common downlink control information indicates that a receiving state of the data packet is that decoding succeeds.

11. The method of claim 1, wherein after the feedback from the network side is received, the method further comprises: in response to determining that a third condition is met, retransmitting the data packet on a resource indicated by a retransmission resource index;
wherein the third condition comprises that the feedback is the common downlink control information, and the common downlink control information contains indication information of the retransmission resource index;
the third condition further comprises at least one of the following:
the feedback from the network side is received in a third preset time slot after the grant-free resource; or
the common downlink control information indicates that a receiving state of the data packet is that the data packet is detected but decoding fails.

12. The method of claim 11, wherein the resource indicated by the retransmission resource index meets at least one of the following:
the resource indicated by the retransmission resource index comprises K continuous time slots; or
the resource indicated by the retransmission resource index starts by default with a fifth preset time slot after a time slot when the feedback is received.

13. The method of claim 1, wherein the downlink control information for uplink grant contains a new data packet indicator.

14. The method of claim 1, further comprising:
when the downlink control information for uplink grant and the common downlink control information are received simultaneously, retransmitting the data packet according to the downlink control information for uplink grant.

15. The method of claim 1, further comprising:
stopping receiving the feedback after the grant-free resource, or determining whether to receive the feedback according to a value of the K.

16. The method of claim 1, wherein after the feedback from the network side is received, the method further comprises: in response to determining that a second condition is met, retransmitting the data packet on a preset retransmission resource;
wherein the second condition comprises at least one of the following:
the feedback from the network side is received in a third preset time slot after the grant-free resource; or
the feedback is the common downlink control information, the common downlink control information indicates that a receiving state of the data packet is one of the following: decoding fails, the data packet is detected but decoding fails, or the data packet is not detected, wherein when the receiving state is that the data packet is detected but decoding fails, the common downlink control information does not contain indication information of a retransmission resource index.

17. The method of claim 16, wherein the preset retransmission resource meets at least one of the following:
a frequency band occupied by the preset retransmission resource is a same as the frequency band of the grant-free resource;
the preset retransmission resource comprises K continuous time slots; or
the preset retransmission resource starts by default with a fourth preset time slot after a time slot when the feedback is received.

18. A non-transitory computer-readable storage medium, which is configured to store computer programs that, when executed by a processor, implement steps of a data transmitting method,
wherein the data transmitting method comprises:
selecting a grant-free resource; and
transmitting a data packet using the selected grant-free resource,
wherein the grant-free resource is K continuous time slots of a frequency band, wherein the K is an integer greater than 0,
wherein the method further comprises: receiving feedback from a network side after a first time slot of the grant-free resource, wherein the feedback comprises at least one of: a terminal-device-specific signal, downlink control information for uplink grant, or common downlink control information, and
wherein after the feedback from the network side is received, the method further comprises: in response to determining that a first condition is met, terminating the transmission of the data packet early, wherein the first condition comprises: the feedback from the network side is received in a time interval from a first preset time slot after the first time slot of the grant-free resource to a second preset time slot before a last time slot of the grant-free resource.

19. A data transmitting device, comprising a memory and a processor, wherein the memory is configured to store computer programs executable by the processor and the processor is configured to:
select a grant-free resource; and
transmit a data packet using the selected grant-free resource,
wherein the grant-free resource is K continuous time slots of a frequency band, wherein the K is an integer greater than 0, wherein the method further comprises: receiving feedback from a network side after a first time slot of the grant-free resource, wherein the feedback comprises at least one of: a terminal-device-specific signal, downlink control information for uplink grant, or common downlink control information, and wherein after the feedback from the network side is received, the method further comprises: in response to determining that a first condition is met, terminating the transmission of the data packet early, wherein the first condition comprises: the feedback from the network side is received in a time interval from a first preset time slot after the first time slot of the grant-free resource to a second preset time slot before a last time slot of the grant-free resource.

* * * * *

UNITED STATES PATENT AND TRADEMARK OFFICE
CERTIFICATE OF CORRECTION

| | |
|---|---|
| PATENT NO. | : 11,343,811 B2 |
| APPLICATION NO. | : 16/497274 |
| DATED | : May 24, 2022 |
| INVENTOR(S) | : Xianming Chen |

It is certified that error appears in the above-identified patent and that said Letters Patent is hereby corrected as shown below:

In the Specification

In Column 10, Line 18, delete "gran-free" and insert --grant-free--.

In Column 28, Lines 25-26, delete "gran-free" and insert --grant-free--.

Signed and Sealed this
Twentieth Day of September, 2022

Katherine Kelly Vidal
*Director of the United States Patent and Trademark Office*